Aug. 14, 1962 J. VESAK 3,049,167
MACHINE FOR MAKING GLUED CELL FORMERS
Filed Feb. 29, 1960 6 Sheets-Sheet 5

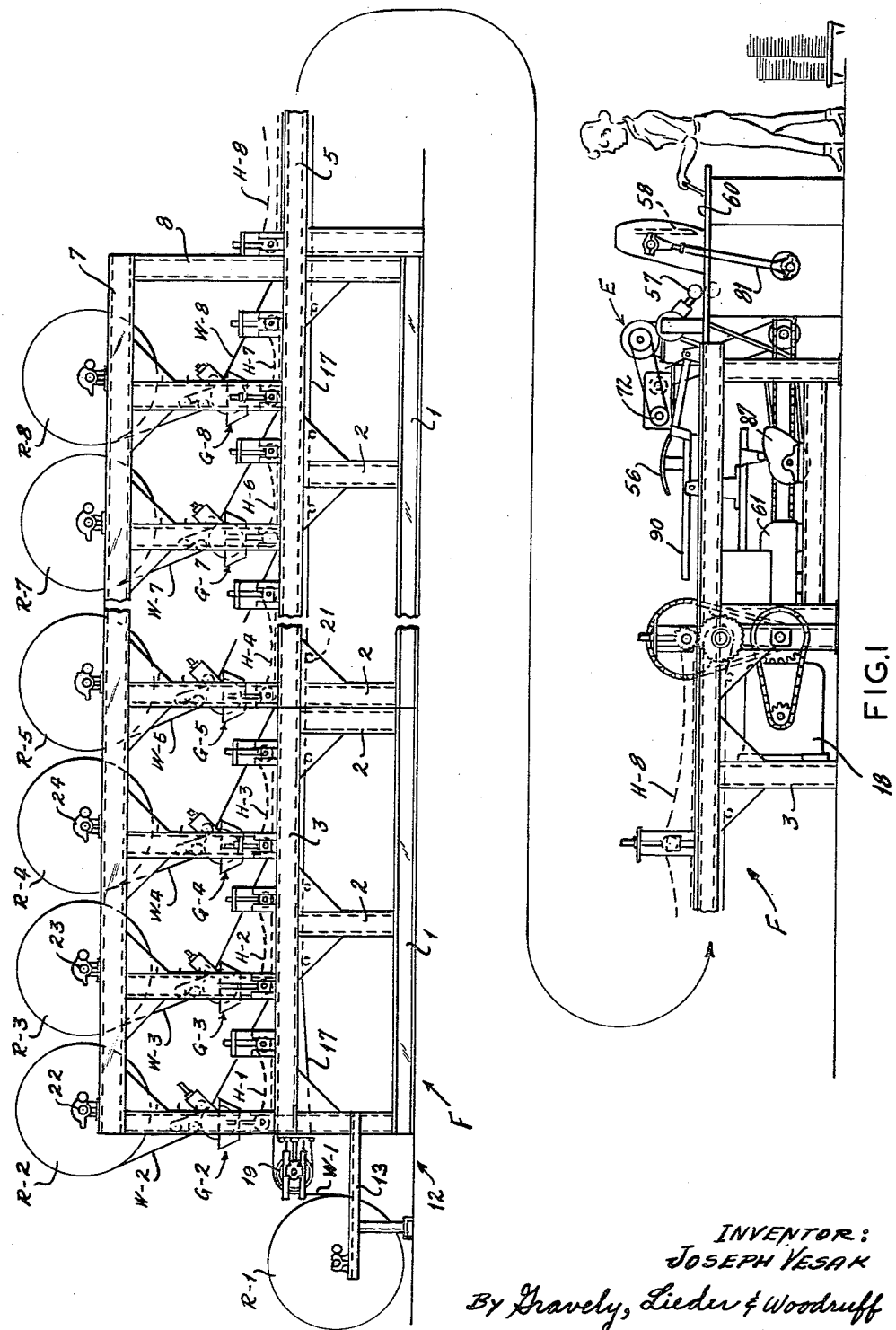

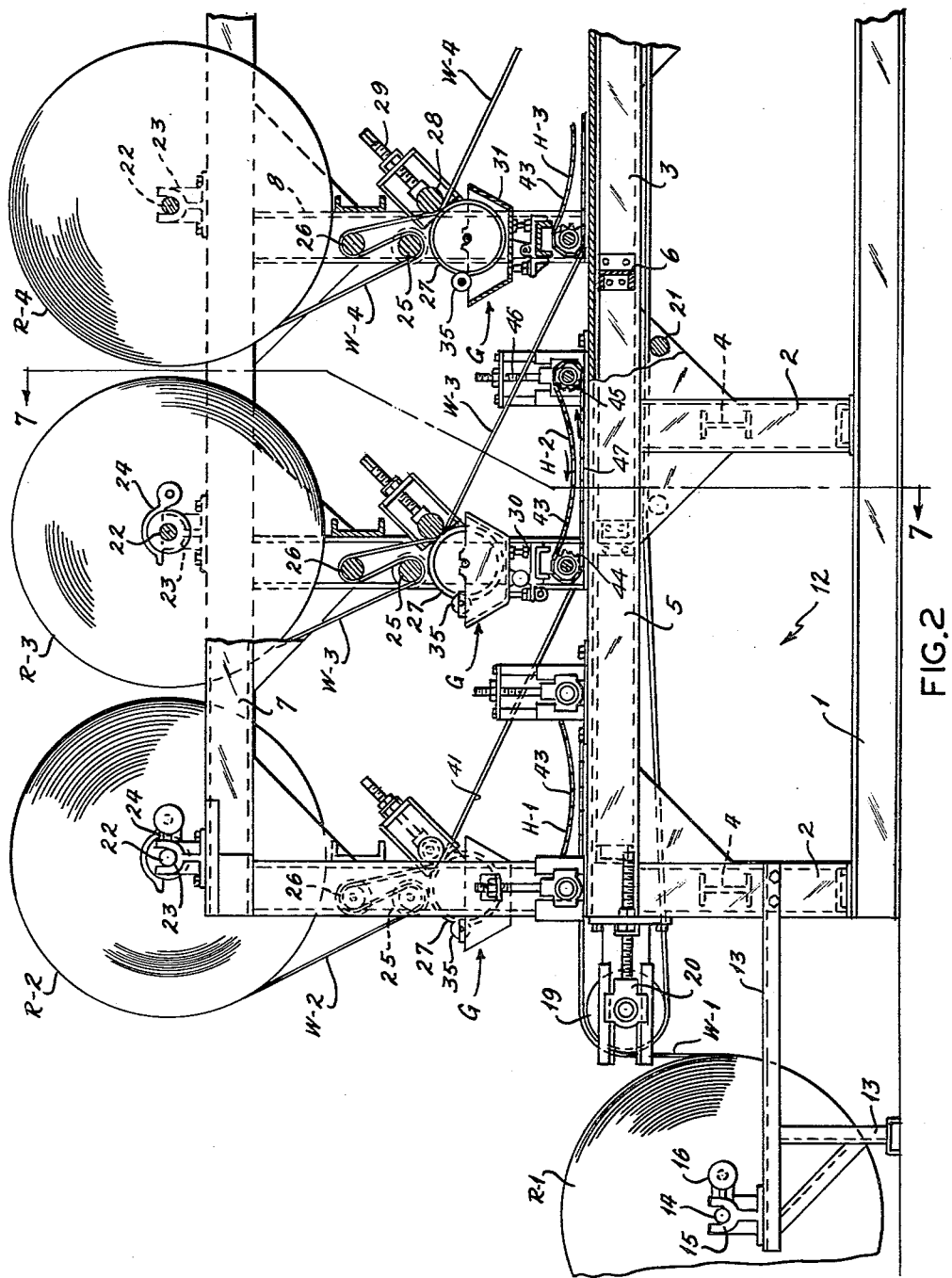

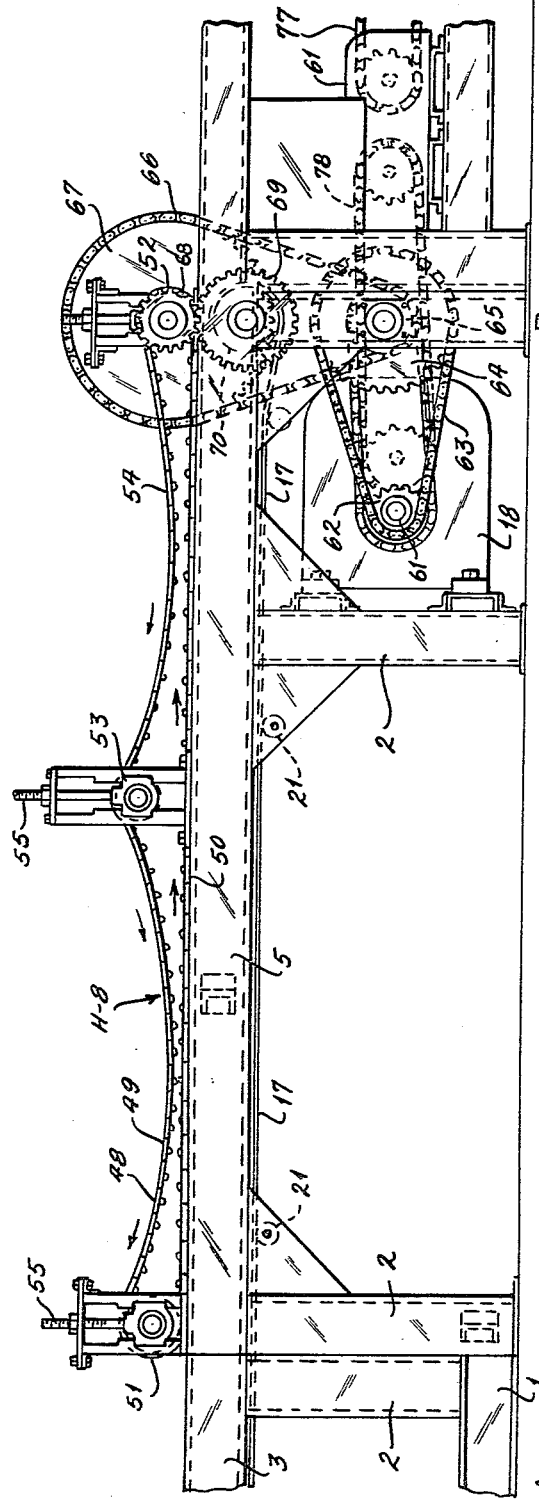

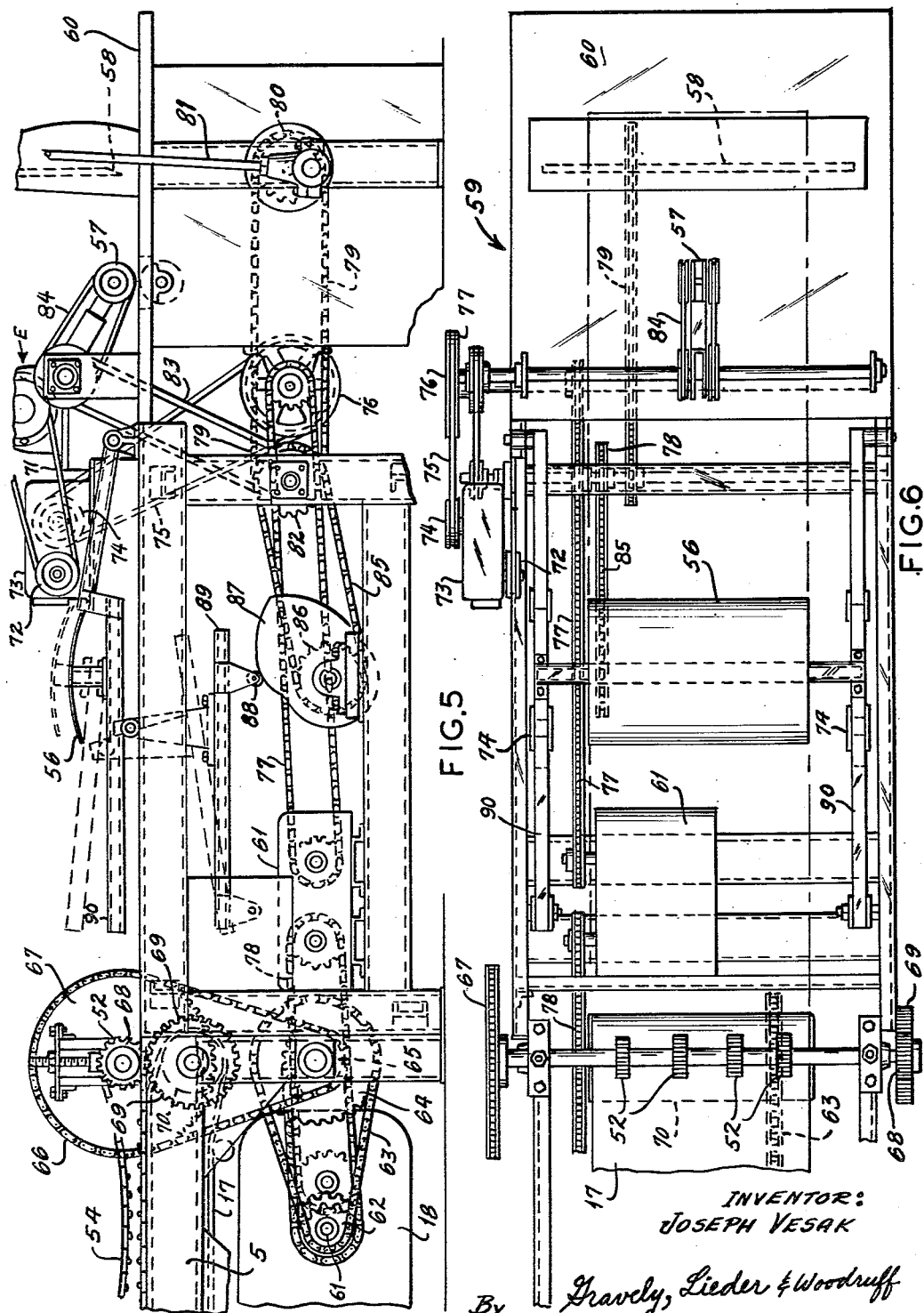

INVENTOR:
JOSEPH VESAK
By Gravely, Lieder & Woodruff
ATTORNEYS.

Aug. 14, 1962 J. VESAK 3,049,167
MACHINE FOR MAKING GLUED CELL FORMERS
Filed Feb. 29, 1960 6 Sheets-Sheet 6
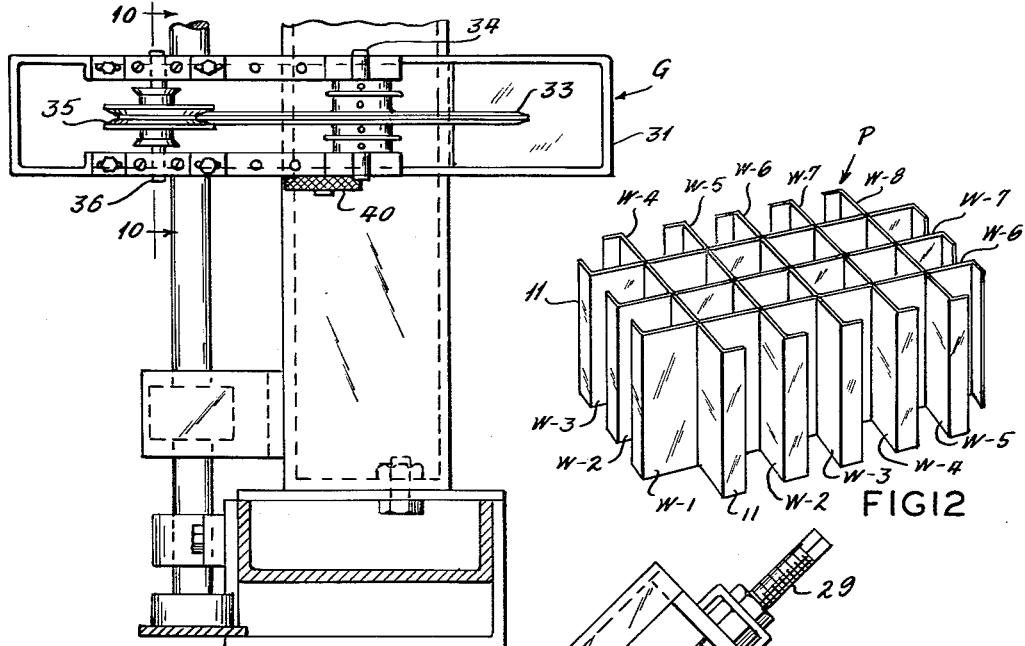
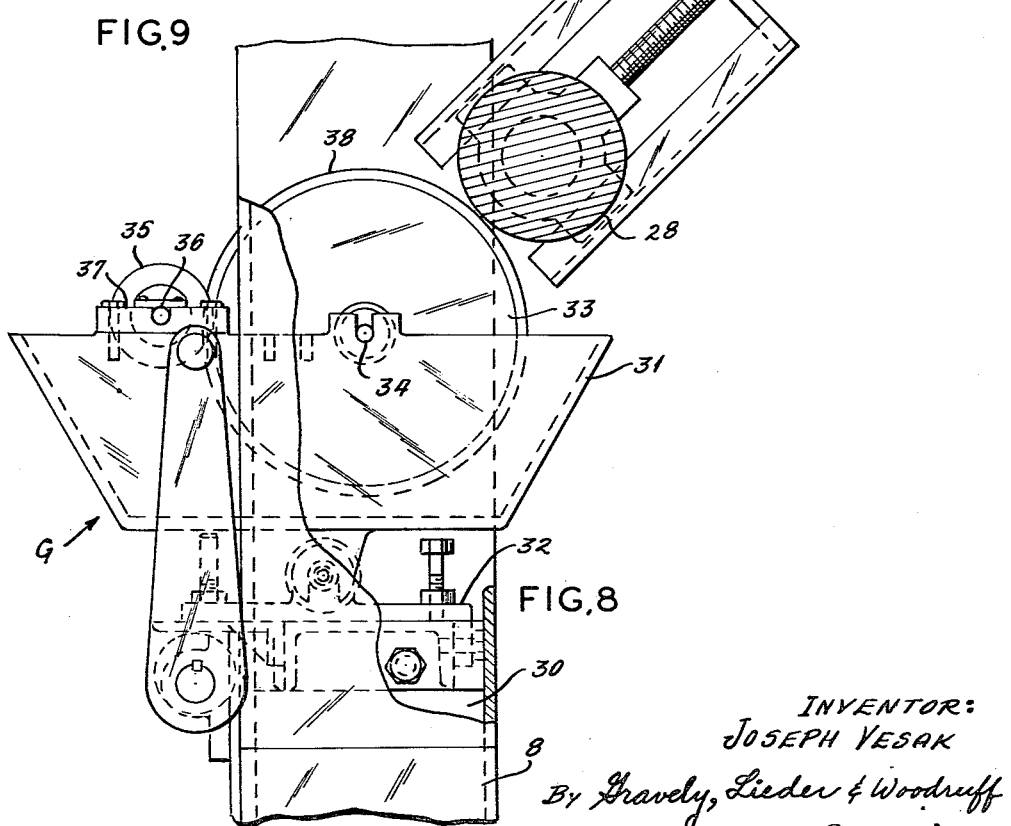
INVENTOR:
JOSEPH VESAK
By Gravely, Lieder & Woodruff
ATTORNEYS.

United States Patent Office 3,049,167
Patented Aug. 14, 1962

3,049,167
MACHINE FOR MAKING GLUED CELL FORMERS
Joseph Vesak, Richmond, British Columbia, Canada, assignor to Crown Zellerbach Canada Limited, a corporation of Canada
Filed Feb. 29, 1960, Ser. No. 11,577
3 Claims. (Cl. 156—548)

This application has subject matter in common with my co-pending patent application Serial No. 738,563 filed May 28, 1958 now Patent No. 3,011,672 entitled "Glued Cell Forming Divider," which relates more particularly to the individual cell former or partition made by the present machine and process.

This invention relates to a machine for continuously making glued cell formers and to the process of bringing rolls of cell forming material together to make cellular partitions. More specifically, the invention relates to the machine itself and to the various sub-combinations of making cellular partitions.

One of the principal objects of the present invention is to provide a machine for continuously making glued cell formers. Another object is to provide a continuous process for making glued cell formers which are made continuously from a plurality of rolls of material whose webs are brought together serially one after the other to assemble the desired cell formers which are then cut are separated from each other. Another object is to provide novel hold down means for holding at least two rapidly moving webs together while they are being glued.

These and other objects and advantages will become apparent hereinafter.

The present invention is embodied in a machine for making unerected glued cell formers, said machine consisting of a back stand for unwinding a multiplicity of rolls of pre-scored paper of varying widths arranged in predetermined sequence and alignment, the web of each roll passing through its own cell defining glue unit and preliminary combiner to form a cumulative laminated structure which is passed through a pressure section prior to the cut-off section where it is cut in predetermined heights governed by the desired cell depth. The invention also is embodied in the process of bringing together the pre-scored webs of varying widths in a continuous manner one after the other to assemble the cell formers.

Figure 10:
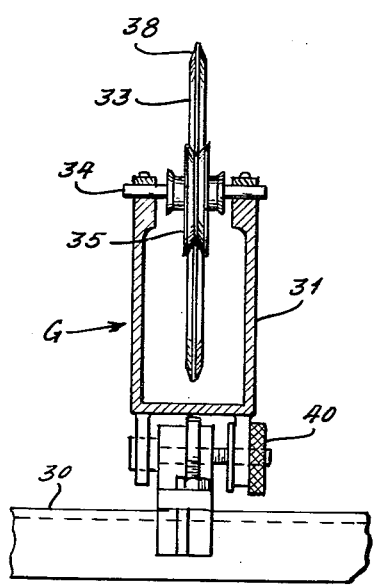
Figure 7:
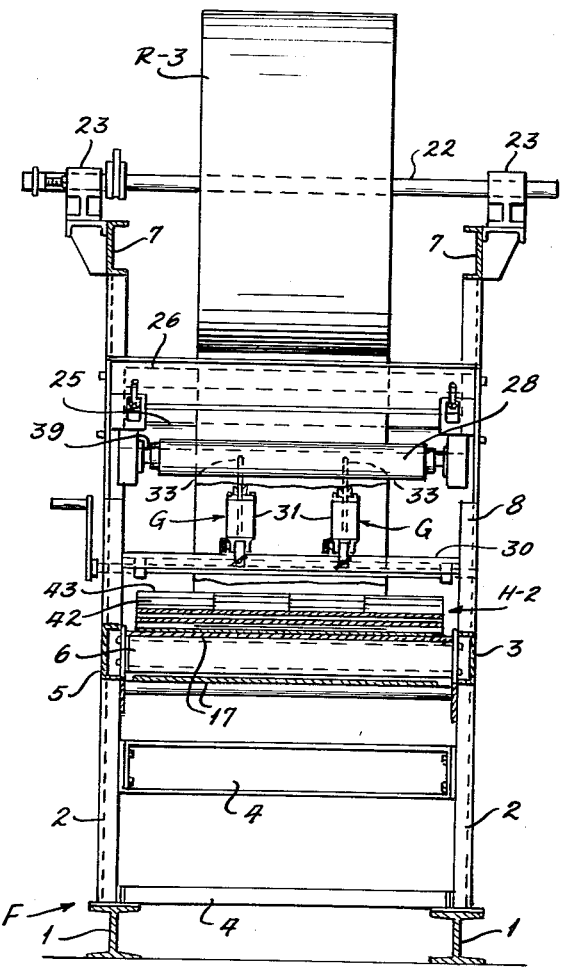
Figure 11:
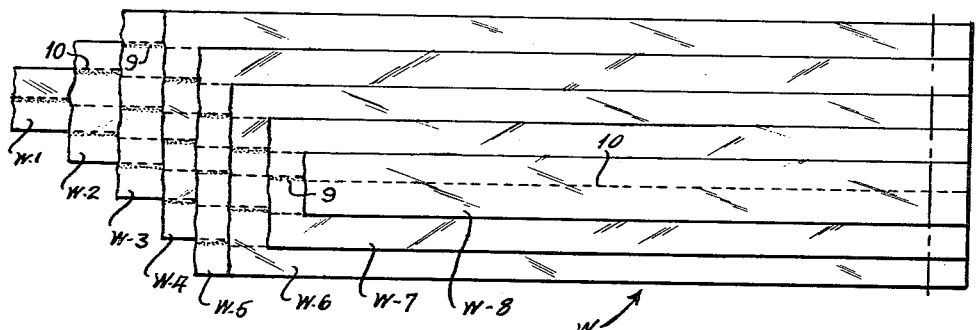

The invention also consists in the parts and in the arrangements and combinations of parts hereinafter described and claimed. In the accompanying drawings which form part of this specification and wherein like numerals and symbols refer to like parts wherever they occur:

FIG. 1 is a side elevational view showing a machine embodying the present invention, said view being broken because of the length of the machine, FIG. 2 is an enlarged fragmentary side elevational view of the front or forward portion of the machine, FIG. 3 is an enlarged fragmentary portion of the rear portion of the machine showing the drive arrangement and power driven hold down means, FIG. 4 is a top plan view of the portion shown in FIG. 3, FIG. 5 is a fragmentary side elevational view of the humper and cut-off portion of the machine, FIG. 6 is a top plan view of the parts shown in FIG. 5, the motor not being shown, FIG. 7 is a vertical cross-sectional view taken along the line 7—7 of FIG. 2, FIG. 8 is an enlarged side elevational view of one of the glue units, FIG. 9 is a top plan view of the glue unit shown in FIG. 8, but without the back-up roll, FIG. 10 is a front view of the glue wheel shown in FIGS. 8 and 9, FIG. 11 is a top plan view of the continuous glued cell former made by the present process and machine, said cell constituting a partition for 24 units, such as bottles and the like, and FIG. 12 is a perspective view of the parts after the continuous cell former has been cut to proper height and folded or erected into bottle receiving position.

Referring now to the drawings in detail, it will be seen that the embodiment of the invention which has been illustrated comprises a machine M having various sections and parts for continuously making glued cell formers or partitions P. The machine M comprises a frame F having a base 1 with upstanding legs 2 which support a horizontal bed 3 about waist high. Cross-supports 4 are provided between the legs 2. The bed 3 has side beams 5 with transverse members 6 therebetween for strength and rigidity. An upper bar 7 is supported above the bed 3 by means of uprights 8, some or all of which may be continuations of the legs 2. Each of the frame members is made from relatively heavy metal to support the great weight of the material and parts of the machine required in the continuous process of making glued cell formers P.

The partition or cell former P is best shown in flat, unerected, and uncut position in FIG. 11, which shows sufficient web material W for forming a 24 cell partition P. From FIG. 11, it will be seen that the joined web W comprises a first or bottom web W–1, intermediate webs W–2 to W–7 and an eighth or top web W–8. Each web W has at least one glue line 9 and pre-score 10. When the joined web shown in FIG. 11 has been cut transversely at predetermined intervals and then folded or erected, it forms a partition P, such as is shown in FIG. 12, but without the gluing tabs 11 which can be added as an optional feature by adding a pre-score 10 and a slight extra width to each side of each web W. The details of the partition P itself are described in detail in my co-pending U.S. application Serial No. 738,563 filed May 28, 1958 entitled "Glued Cell Forming Divider." It should be noted that the individual webs W–1 to W–8 are pre-scored as at 10, are glued as at 9, and are of varying widths, and each web W must be properly oriented with respect to the next adjacent web so that the partition P folds properly into erected position along the pre-scores 10. It will be noted that the bottom web W–1 is of two cell widths and the second through eighth webs W–2 to W–8 are respectively of 4, 6, 7, 7, 6, 4, and 2 cells widths. Of course, the present description is for a 24 cell unit P, and different numbers of webs W and positions with respect to each other are required for cell units having 6, 12, etc. cells. With the partition shown in FIG. 11, the number of score lines and glue attachments with the next adjacent web for webs W–1 to W–8 respectively are 1, 3, 5, 6, 6, 5, 3, and 1. Of course, if gluing tabs 11 are desired, then each web has an end score for defining each of said two gluing tabs.

The frame F has a front portion 12 with a support 13 for holding a roll R–1 of web material which forms the first or bottom web W–1. This roll R–1 is mounted on a rotatable shaft 14 which fits into a bearing 15 with brake means 16 thereon. The bottom web W–1 is directed onto the bed 3 of the machine M in direct contact with a main belt 17 which is driven by a power source E through the gear box 18. The main belt 17 extends over a major portion of the machine and is continuous. It has end idlers 19 with a suitable adjusting means 20 thereon for maintaining the proper adjustment or tightness on the belt 17. Suitable supporting and idling rollers 21 are positioned at spaced intervals between the end idlers 19.

The upper bar 7 supports a multiplicity of rolls R of web material, such as rolls R–2 to R–8, in an elevated position. The number of rolls R depends upon the number of cells desired in the partition to be formed, and whether the cell unit is to be circumscribed by a liner (not shown) to enclose all cells. With the 24 cell partition shown, seven upper rolls R–2 to R–8 are required, since the partition P comprises eight separate webs W. Each roll mechanisms R–3 to R–8 is the same as the first or front roll R–2 which is mounted on a shaft 22 which rotatably is supported in bearings 23 with a brake 24 associated therewith. The roll R–2 is adapted to rotate counterclockwise, as shown in FIGS. 1 and 2, so that the web W–2 can be threaded to move below an idler 25 and then above the idler 26 and then to the glue unit G, and specifically between a glue wheel 27 and a back-up wheel 28 having adjusting means 29 thereon.

Each glue unit G is suitably mounted transversely between the uprights 8 on a crossbar 30. A glue pan 31 is supported by a glue pan clamp 32 on the crossbar 30. Each glue pan 31 is provided with at least one glue wheel 27 with a glue applying surface 33 mounted on a shaft 34 which is free to rotate. A glue doctor wheel 35 is mounted on a trunnion shaft 36 in an adjustable bearing 37 to maintain the proper amount of glue on the outer edge 38 of the glue wheel 27 against which the web W–2 is directed. A back-up roll 28 with an adjusting screw 29 is rotatably mounted on a transverse support 39 on the opposite side of the web W–2 to maintain said web against the glue wheel 27 with the proper force. An adjusting hand wheel 40 is provided to move the glue wheel 33 laterally so as to adjust it for the precise lateral position desired.

The web W–2 with the longitudinal thin line of glue applied to its bottom surface 41 is then directed under floating hold down means H–2 which forces it into contact with the bottom web W–1. The floating hold down means H–2 is not power driven and comprises a heavy endless chain 42 of individual flat links 43 mounted between two sprockets 44 and 45 which can be adjusted by adjusting means 46 so that the bottom portion 47 of the chain 42 is free to move longitudinally with the web W–2. Thus, the driven main belt 17 frictionally drives the bottom web W–1 to which the second web W–2 is glued, and the second web frictionally causes the chain 42 to rotate.

In a similar fashion, the third web W–3 and remaining webs W are directed from their respective rolls R under and over idlers 25 and 26 to the glue units G and then under the floating chain H of the next succeeding unit. In this manner, each web is serially attached to the web which has previously been applied until the proper number of webs have been joined.

It will be noted from FIG. 11 that the bottom roll R–1 and each upper roll R–2 to R–8 must be properly oriented laterally with respect to each other. In addition, each bottom and top roll R must have material which is properly pre-scored unless separate pre-scoring means, not shown, are positioned in the machine immediately ahead of the glue means G. Each glue means G must have the proper number of glue rolls or wheels 27 since various numbers of thin longitudinal glue lines 9 must be applied to the different webs W. For example, the second web W–2 requires only one glue wheel 27 whereas the third web W–3 requires two glue wheels 27 and the fourth web W–4 requires three glue wheels 27, etc., since different numbers of glued connections 9 are required as best explained in my co-pending application Serial No. 738,563.

The first hold down means H–1 is similar to the hold down means H–2, but is adjusted to a height over the main belt 17 of approximately the thickness of the web W–1. Each of the other various hold down means H is similar to the described hold down means H–2, and is spaced from the main belt 17 to accommodate the proper number of webs W which have been joined and to exert downwardly pressure thereon to glue the webs to each other.

Beyond the rear portion of the upper bar 7 and top rolls R, the bed 3 is provided with a power driven hold down chain H–8 over a predetermined length to keep the joined webs W in tight contacting relationship during any final sitting of the glue.

Each of the independent hold down chains 42 is made from a plurality of heavy metal links 43, which have been found to give the best results. These links 43 are flat on their outer or web contacting surface. The power driven hold down means H–8 also comprises a heavy chain 48 made from a plurality of heavy metal links 49 which are pivotally joined together and form a heavy weight for holding the joined webs W together. The bottom 50 of the chain 48 is flat and moves at the same speed as the belt 17. It will be noted that each of the hold down means H contacts the web W over a substantial distance and entirely across its width and move at the same linear velocity as said web W. Therefore, sufficient weight is placed above each web W as it is joined to the proceeding webs and the power driven hold down means H–9 furnishes sufficient frictional power to the top web W–8 and the exposed top portions of the subjacent webs along with the power furnished by the main belt 17 against the bottom web W–1 and the exposed bottom portions of the adjacent webs so that the webs W are pulled through the machine M and cause the rolls R to automatically unwind.

The chain 48 moves about the end sprockets 51 and 52 which have an idler 53 therebetween to support the upper rearwardly moving portion 54. Suitable adjustment means 55 are provided on the members 51—53. Power is supplied to the sprocket 52 as will be explained.

The web W then passes from the rear end of said chain H–8 at said sprocket 52 over a movable humper plate 56 and then under the hold down roll 57 positioned forwardly of the cut-off knife 58 at the rear portion 59 of the machine M. A small table 60 is provided rearwardly of the cut-off knife 58 so that an operator can receive and stack the formed but unerected partitions P. If desired, different mechanical means for cutting the continuous joined web W at predetermined intervals may be provided, but the present arrangement has been found to give excellent results.

The electric motor E through suitable drive connections drives the main belt 17 and the power driven chain 48. In addition, the motor E also actuates the humper plate 56 and knife 58 by means of a suitable drive connection. Separate motors may be used if desired, but regardless of the number of motors, the timing of the various parts is important.

The gear box 18 drives the heavy chain 48 through a shaft 61 having a sprocket 62 which rotates a chain 63 which moves the gear 64 thereby rotating the pinion 65 and chain 66 which rotates the sprocket 67 and sprocket 52 immediately above the bed 3. This end sprocket 52 causes the hold down chain H–8 to rotate counterclockwise at the same linear speed as the joined web W.

The gear box 18 drives the main belt 17 through the same drive connections heretofore mentioned except that another sprocket 68 above the bed 3 rotates the gear 69 which in turn rotates end roll 70 and the main belt 17 in a clockwise direction at the same linear speed as the hold down chain 48. In other words, the bottom 50 of the hold down chain 48 and the top of the main belt 17 move rightwardly toward the rear of the machine, as shown, at the same linear velocity.

The motor E drives a belt 71 which rotates a pulley 72 in a gear box 73. This drives a pulley 74 on which is a belt 75 which drives the sprocket 76. The sprocket 76 rotates a chain 77 which drives the shaft 61, which in turn drives the gear box 18 through a chain 78. The sprocket 76 also rotates a chain 79 which rotates a gear 80 to which is attached an upstanding member 81 which actuates the cut-off knife 58. The chain 79 also rotates a sprocket 82 which moves a belt 83 which supplies movement to the belt 84 which rotates the hold down roll 57. The sprocket 82 rotates the chain 85 which rotates the gear 86 and cam 87, which moves a follower 88 and pivoted bars 89 and 90 to which the humper plate 56 is attached thereby causing the humper plate 56 to move between an upper position, shown in dotted lines in FIG. 5, to its lower position, shown in full lines. The up and down movement of the humper plate 56 causes the material to hump or bend slightly in a predetermined arc to temporarily buckle the web materail W or take up the material as it is being fed at a relatively constant rate to the humper 56 during the time that the material rightwardly of the feed roll 57 is temporarily stopped for the cutting operation.

Of course, the entire structure rightwardly of the power driven hold down chain H–8 can be replaced with cooperating and rotatable knife blades which rotate at the same linear speed as the joined web W. However, it has been found that the present arrangement wherein all movable parts are actuated by one prime mover or motor 18 gives excellent results. A standard vertically movable guillotine cutter 58 can be used as shown, but this requires the material to be stopped while the cutting takes place. Therefore, suitable means to take up the slack of the material is required while the rear end of the web is stopped. The humper plate 56 and drive mechanism accomplishes this in a satisfactory manner.

The operation of the machine is apparent from the foregoing description. For proper operation, the parts must be properly adjusted so that the bottom and top rolls R are properly positioned laterally on their respective shafts and have material of proper pre-scoring and width thereon. The motor E drives the parts so that the gearing and timing are proper to insure uniform linear speed of the main belt 17 and hold down chain H–8. The actions of the humper plate 56 and cut-off knife 58 are properly synchronized.

With the rolls R of material in proper position and all parts properly adjusted, the bottom web W–1 is placed on the bed 3 on top of the main belt 17 and threaded under each of the floating chains H–1 to H–7, under the power chain H–8, over the humper plate 56, under the power driven roll 57 and cut-off knife 58. The second web W–2 is threaded through the idlers 25 and 26 and glue means G–1 and under the next succeeding floating chain H–2 to bring it into contact with the bottom web W–1. The third web W–3 is similarly threaded through its idlers and glue means and under the next succeeding floating chain H–3 to glue it with the second web W–2. Each succeeding web is similarly threaded and the entire joined web W is then threaded under the power driven chain H–8 and directed over the humper plate 56 and then under the hold down roll 57 and cut-off knife 58. At this point, the motor can be actuated to send power to the main belt 17, chain H–8, humper plate mechanism 56 and cut-off knife 58.

Thus, a continuous and endless joined web is formed. This web is cut transversely at predetermined intervals depending upon the height of the partition P desired and the machine can run until the rolls R of material are exhausted. If desired, cooperating rolls, not shown, can be positioned on the bed 3 rightwardly of the sprocket 52 of the hold down means H–8 to add power to the web W for pulling it through the machine.

This invention is intended to cover all changes and modifications of the example of the invention herein chosen for purposes of the disclosure, which do not constitute departures from the spirit and scope of the invention.

What I claim is:

1. A machine for making glued cell formers, said machine having a frame with a continuous main driven belt thereon extending over a major portion of the machine, common power means for moving said belt and hold down means and cut off means, means at one end of the conveyor belt for supporting a roll of web material having its web adapted to extend longitudinally over said belt in flat contacting relation therewith to form a bottom web, means for supporting a series of elevated rolls of web material, said means being longitudinally spaced along and above said belt and in spaced vertical relationship therewith, glue applicating means spaced below and cooperating with the elevated web material rolls for applying a thin line of glue longitudinally to each of the webs parallel and in spaced relation to their edges, web hold down means positioned longitudinally along said machine between said glue applying means and above said main belt, each of the elevated webs being directed beneath said hold down means at spaced intervals longitudinally of said moving belt against the web immediately therebelow to glue the two together, said hold down means comprising an endless chain composed of a plurality of heavy links pivotally joined together and each link having a flat outer web contacting surface, said hold down means each constructed and arranged to frictionally contact the upper surface of each web over a substantial longitudinal distance and over substantially its entire width so as to be moved at the same linear velocity as the web, and independent power driven hold down means positioned over said belt at a point beyond that point where all of said webs have been joined one above the other, said power driven hold down means comprising an endless chain frictionally engaging the top web and urging the glued webs against said main belt to allow the glued webs to become fixedly secured to each other, said power driven hold down means being driven at the same linear velocity as said main belt.

2. The machine defined in claim 1, including cut-off means positioned on said machine and driven by said common drive means to sever a predetermined length of the joined webs.

3. The machine defined in claim 2 including a vertically moving plate positioned between the end of the main driven belt and the cut-off means, said plate having an arcuate upper face adapted to contact the underside of the joined web, a cam rotatably driven by said common drive means, a cam follower connected to said plate and engaged with the surface of said cam, said plate adapted to move the joined web upwardly and downwardly as the cam is rotated to compensate for slack in the constantly moving web, whereby the linear motion of the joined web leaving said main belt is constant as the end of the joined web is intermittently halted during severance thereof and severing the web.

References Cited in the file of this patent

UNITED STATES PATENTS

| | | |
|---|---|---|
| 2,494,437 | George et al. | Jan. 10, 1950 |
| 2,549,802 | George et al. | Apr. 24, 1951 |
| 2,610,934 | Steele | Sept. 16, 1952 |
| 2,619,444 | Grantham | Nov. 25, 1952 |
| 2,636,540 | Lincoln | Apr. 28, 1953 |
| 2,670,026 | Ungar | Feb. 23, 1954 |
| 2,670,314 | Ungar | Feb. 23, 1954 |
| 2,719,807 | Steele | Oct. 4, 1955 |
| 2,926,720 | Gosman | Mar. 1, 1960 |